July 3, 1923.
A. M. SAUNDERS
PIPE
Filed July 7, 1921
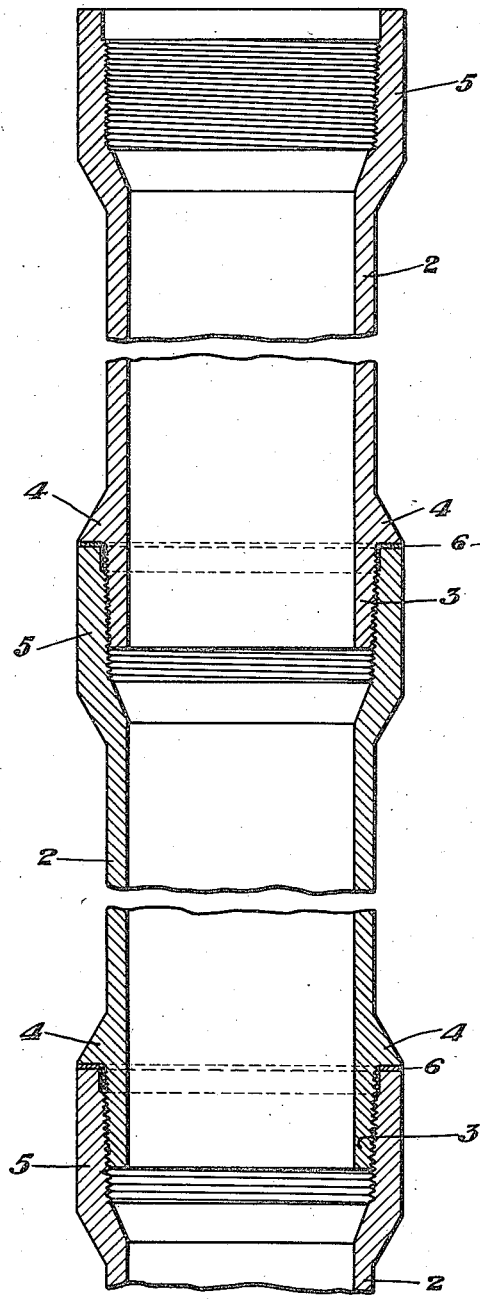
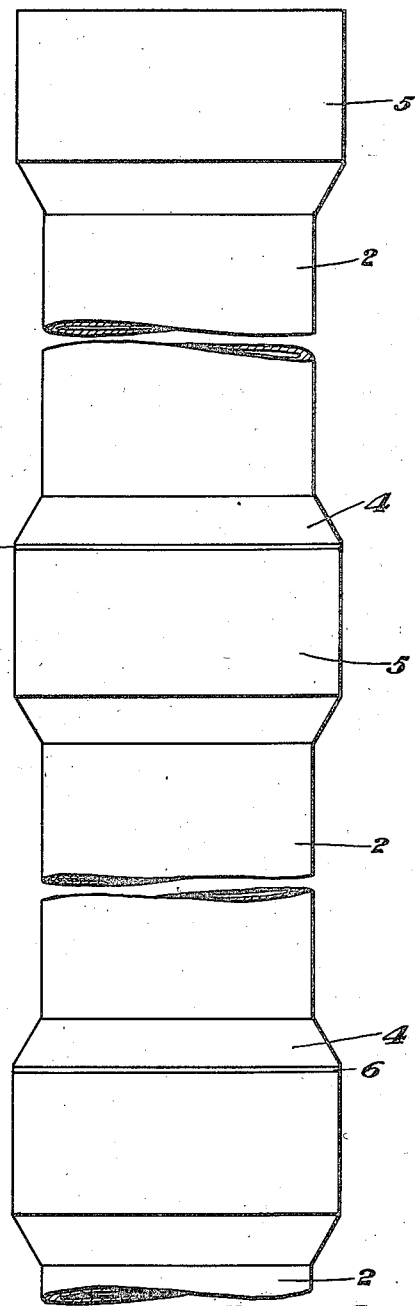
Inventor:
AUGUSTUS M. SAUNDERS.

Patented July 3, 1923.

1,460,769

UNITED STATES PATENT OFFICE.

AUGUSTUS M. SAUNDERS, OF McKEESPORT, PENNSYLVANIA, ASSIGNOR TO NATIONAL TUBE COMPANY, OF PITTSBURGH, PENNSYLVANIA, A CORPORATION OF NEW JERSEY.

PIPE.

Application filed July 7, 1921. Serial No. 483,023.

*To all whom it may concern:*

Be it known that I, AUGUSTUS M. SAUNDERS, a citizen of the United States, and resident of McKeesport, in the county of Allegheny and State of Pennsylvania, have invented certain new and useful Improvements in Pipes, of which the following is a specification.

This invention relates to wrought metal pipes and while not limited thereto relates particularly to steel line pipes, and has for its principal object the provision of a wrought metal pipe having an integral nipple or coupling at one end and a male threaded portion terminating in an integral abutting flange on the other end adapted to be threaded into the nipple or coupling of the next adjoining pipe.

Heretofore wrought metal pipes have been made having both ends threaded and separate coupling members have been used to connect the pipes together. In the present invention the coupling is made an integral part of the pipe, making a stronger and tighter joint at a less cost.

One embodiment of my invention is illustrated in the accompanying drawings, in which Figure 1 is an elevation of a series of connected pipes.

Figure 2 is a sectional elevation through the pipes of Figure 1.

Referring particularly to the drawings, the numeral 2 designates the lengths or sections of pipe, which are provided with a male threaded end 3 terminating in an integral abutting flange or shoulder 4, formed by upsetting the pipe body outwardly without changing the thickness of the pipe wall above or below the shoulder flange, or changing the interior diameter of the pipe.

The other end of each of the pipe sections 2 is provided with an integral internally threaded coupling member 5 formed by expanding and upsetting the end of the pipe outwardly until the interior diameter of the coupling is sufficiently large to permit the entrance of the male threaded portion 4 of the next adjoining pipe.

The coupling 5 is considerably thicker than the remainder of the pipe wall, and, therefore, adds to the strength of the pipe.

The threads on both the male end 3 and in the coupling member 5 are tapered so as to form a tight joint.

If desired, a gasket 6 may be inserted between the end of the coupling 5 and the face of the shoulder 4 to insure a leak-proof joint.

The length of the male end of the pipe sections is preferably shorter than the length of the coupling 5, so that the pipes may be threaded together until the coupling engages the face of shoulder 4.

It will be noted that a pipe constructed in accordance with my invention has a substantially equal diameter throughout its length, since the coupling is expanded so that its inside diameter is equal to the outside diameter of the male end.

I claim:—

A wrought metal pipe having a male thread on one end, an integral flat faced shoulder flange formed at the rear end of said male thread by upsetting the wall of the pipe outwardly only, said flange being adapted to form a bearing for a gasket, and an intergral threaded coupling portion formed on the opposite end of said pipe, said coupling portion being formed by upsetting and expanding the pipe wall outwardly until said coupling portion has a substantially thicker wall than said pipe and an inner diameter equal to the outer diameter of said male threaded end, said male end being of shorter length than said coupling member, and said pipe being of the same internal diameter throughout its length with the exception of the expanded coupling portion, substantially as and for the purpose described.

In testimony whereof, I have hereunto set my hand.

AUGUSTUS M. SAUNDERS.